(12) United States Patent  
Evulet

(10) Patent No.: US 12,466,547 B2
(45) Date of Patent: Nov. 11, 2025

(54) STREAMLINE AIRFRAME WITH BOUNDARY INGESTION FLUIDIC PROPULSIVE ELEMENTS

(71) Applicant: JETOPTERA, INC., Edmonds, WA (US)

(72) Inventor: Andrei Evulet, Edmonds, WA (US)

(73) Assignee: Jetoptera, Inc., Edmonds, WA (US)

( * ) Notice: Subject to any disclaimer, the term of this patent is extended or adjusted under 35 U.S.C. 154(b) by 0 days.

(21) Appl. No.: 18/772,910

(22) Filed: Jul. 15, 2024

(65) Prior Publication Data

US 2024/0367777 A1 Nov. 7, 2024

Related U.S. Application Data

(63) Continuation of application No. 15/733,822, filed as application No. PCT/US2019/034409 on May 29, 2019, now Pat. No. 12,037,104.

(60) Provisional application No. 62/677,419, filed on May 29, 2018.

(51) Int. Cl.
| | |
|---|---|
| *B64C 21/01* | (2023.01) |
| *F02C 3/04* | (2006.01) |
| *B64D 33/02* | (2006.01) |
| *F02K 1/36* | (2006.01) |

(52) U.S. Cl.
CPC ............. *B64C 21/01* (2023.01); *F02C 3/04* (2013.01); *B64D 2033/0226* (2013.01); *F02K 1/36* (2013.01); *F05D 2220/323* (2013.01)

(58) Field of Classification Search
CPC ......... F02C 3/04; B64C 21/02; B64C 21/025; B64C 21/04; B64D 2033/0226; F02K 1/36; F05D 2220/323
See application file for complete search history.

(56) References Cited

U.S. PATENT DOCUMENTS

| | | |
|---|---|---|
| 3,005,496 A | 10/1961 | Nichols |
| 8,087,618 B1 | 1/2012 | Shmilovich et al. |
| 8,894,019 B2 | 11/2014 | Alvi |
| 9,108,725 B1 | 8/2015 | Shmilovich et al. |
| 9,193,436 B2 | 11/2015 | Bernhardt |
| 9,714,082 B2 | 7/2017 | Shmilovich et al. |
| 11,597,503 B2 | 3/2023 | Kreuzer et al. |
| 2006/0202082 A1 | 9/2006 | Alvi |
| 2009/0261206 A1 | 10/2009 | Alvi |
| 2009/0288711 A1 | 11/2009 | Alvi |
| 2014/0182695 A1 | 7/2014 | Alvi |

(Continued)

*Primary Examiner* — Benjamin P Lee
(74) *Attorney, Agent, or Firm* — Richard T. Black; FisherBroyles, LLP

(57) ABSTRACT

A vehicle includes a main body and at least one wing coupled to the main body. A source of compressed fluid is coupled to the main body. The vehicle further includes first and second thrusters, each said first and second thruster having an intake structure and each said first and second thruster in fluid communication with the source. The first thruster is coupled to the main body and the second thruster is coupled to the at least one wing. The first and second thrusters are positioned, when in a first configuration, such that at least a portion of a boundary layer produced due to motion of the vehicle is ingested by the intake structures of the first and second thrusters. The vehicle further includes a system for selectively providing the compressed fluid to the first and second thrusters.

5 Claims, 10 Drawing Sheets

(56) References Cited

U.S. PATENT DOCUMENTS

2017/0057621 A1    3/2017  Evulet
2017/0057647 A1*  3/2017  Evulet ................... B64D 33/04
2017/0057648 A1    3/2017  Evulet

* cited by examiner

STREAMLINE AIRFRAME WITH BOUNDARY INGESTION FLUIDIC PROPULSIVE ELEMENTS

PRIORITY CLAIM

The present application is a continuation of application Ser. No. 15/733,822, filed Nov. 30, 2020, titled "Streamline Airframe with Boundary Ingestion Fluidic Propulsive Elements", which is a National Stage filing of PCT Application Serial No. PCT/US2019/034409, filed May 29, 2019, titled "Streamline Airframe with Boundary Ingestion Fluidic Propulsive Elements", which claims priority from U.S. Provisional Patent Appl. No. 62/677,419 titled "Streamline Airframe with Boundary Ingestion Fluidic Propulsive Elements" filed May 29, 2018, the contents of which are hereby incorporated by reference in their entirety.

COPYRIGHT NOTICE

This disclosure is protected under United States and/or International Copyright Laws. C 2019 Jetoptera, Inc. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

Among the many objectives of aircraft design are the minimization or elimination of major rotating parts, reducing overall weight of the aircraft and lowering the overall drag profile of the aircraft and.

BRIEF DESCRIPTION OF THE DRAWING FIGURES

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Figure 1:
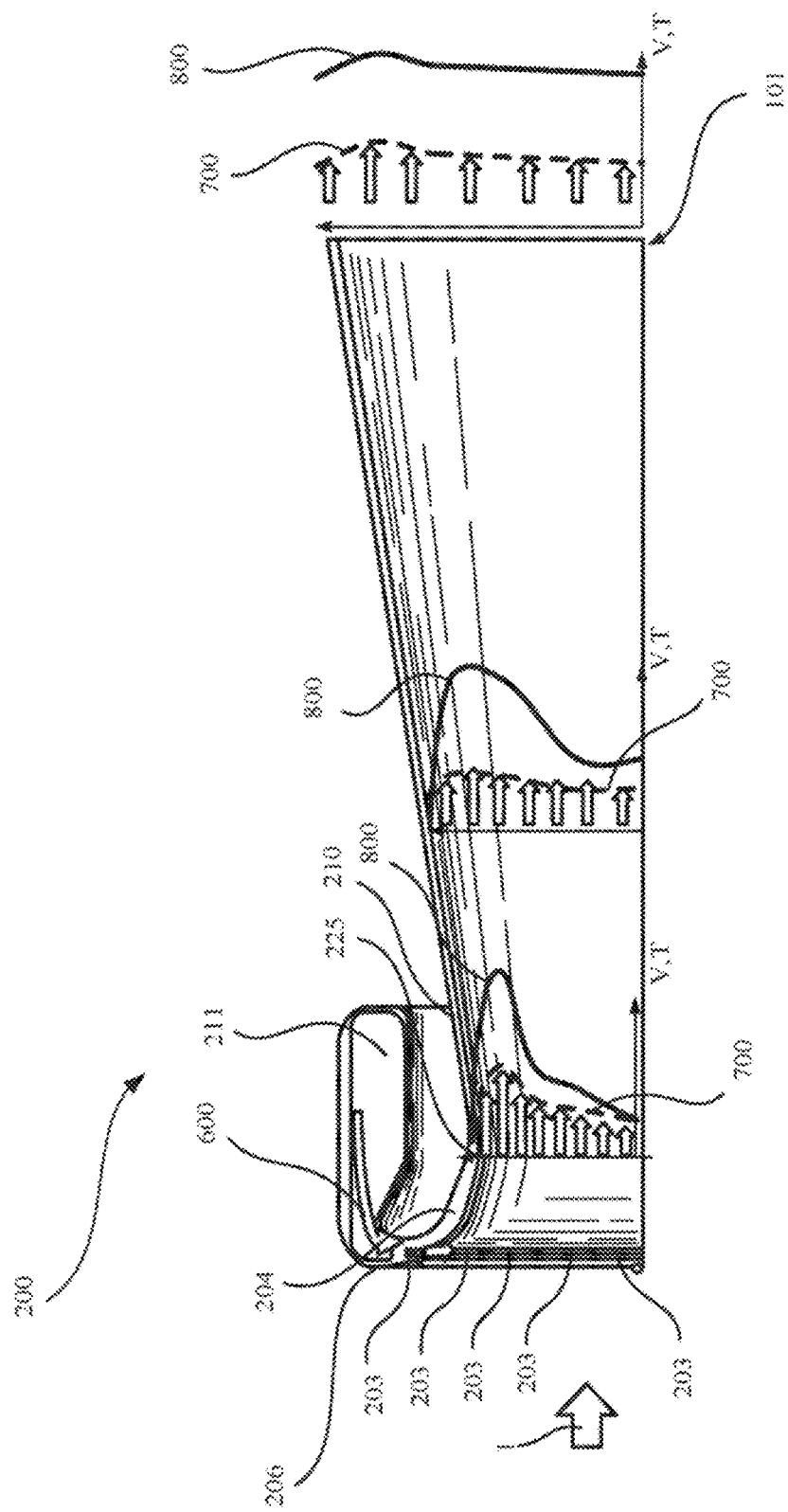
FIG. 1 is a cross-section of one embodiment of the present invention depicting the upper half of an ejector and profiles of velocity and temperature within the internal flow.

FIG. 1 illustrates a cross-section of the upper half of a thruster, such as ejector 200, that may be attached to a vehicle (not shown), such as, for non-limiting examples, a UAV or a manned aerial vehicle, such as an airplane. A plenum 211 is supplied with hotter-than-ambient air (i.e., a pressurized motive gas stream) from, for example, a combustion-based engine that may be employed by the vehicle. This pressurized motive gas stream, denoted by arrow 600, is introduced via at least one conduit, such as primary nozzles 203, to the interior of the ejector 200. More specifically, the primary nozzles 203 are configured to accelerate the motive fluid stream 600 to a variable predetermined desired velocity directly over a convex Coanda surface 204 as a wall jet. Additionally, primary nozzles 203 provide adjustable volumes of fluid stream 600. This wall jet, in turn, serves to entrain through an intake structure 206 secondary fluid, such as ambient air denoted by arrow 1, that may be at rest or approaching the ejector 200 at non-zero speed from the direction indicated by arrow 1. In various embodiments, the nozzles 203 may be arranged in an array and in a curved orientation, a spiraled orientation, and/or a zigzagged orientation.

The mix of the stream 600 and the air 1 may be moving purely axially at a throat section 225 of the ejector 200. Through diffusion in a diffusing structure, such as diffuser 210, the mixing and smoothing out process continues so the profiles of temperature (800) and velocity (700) in the axial direction of ejector 200 no longer have the high and low values present at the throat section 225, but become more uniform at the terminal end 100 of diffuser 210. As the mixture of the stream 600 and the air 1 approaches the exit plane of terminal end 100, the temperature and velocity profiles are almost uniform. In particular, the temperature of the mixture is low enough to be directed towards an airfoil such as a wing or control surface.

Figure 2:
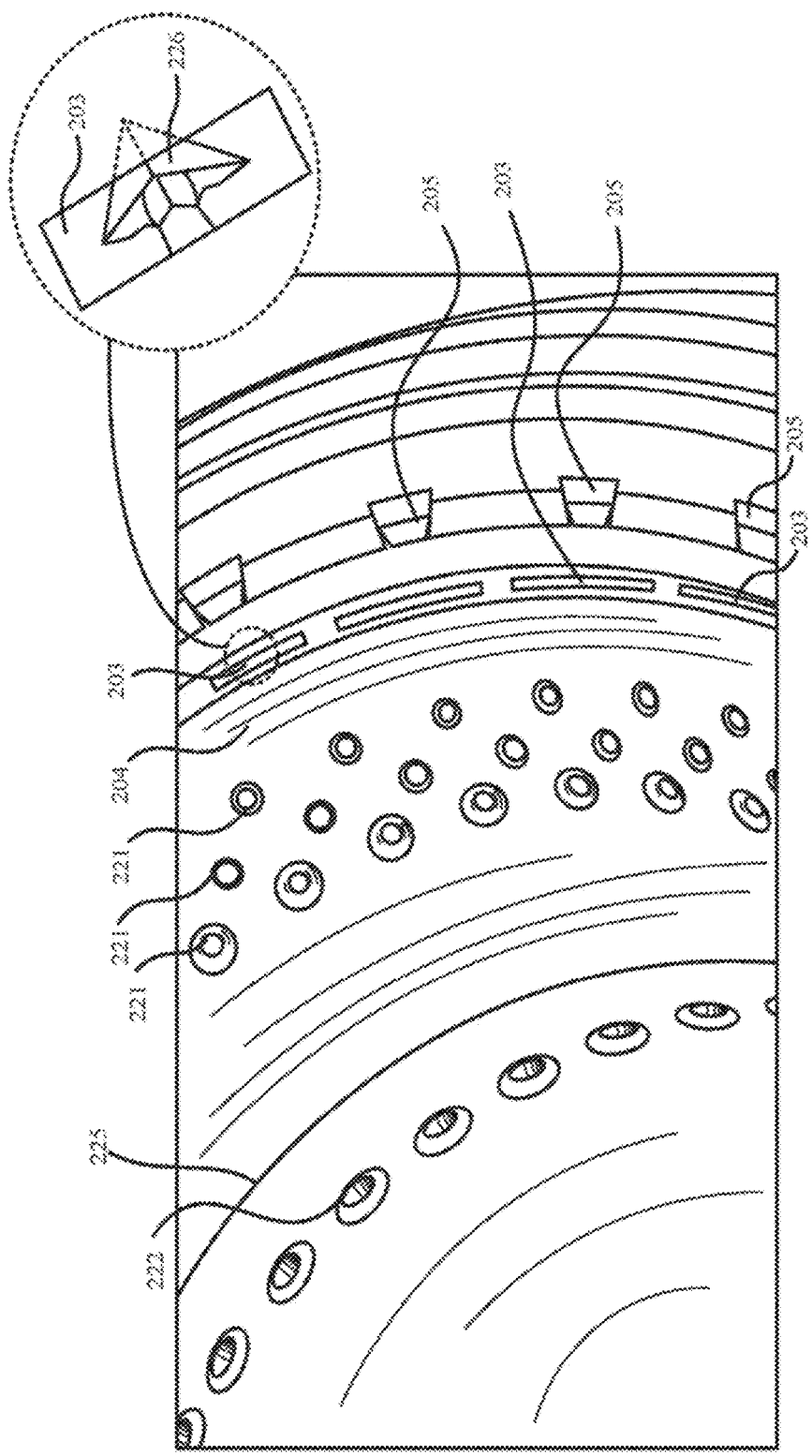
FIG. 2 illustrates features of surfaces of the ejector of FIG. 1 according to an embodiment.

In an embodiment, and as best illustrated in FIG. 2, V-shaped, vortex generating secondary nozzles 205 are staggered when compared to a normal rectangular primary nozzle 203 and injecting at least 25% of the total fluid stream 600 before the balance of the fluid stream massflow is injected at a moment later by nozzles 203. This injection by nozzles 205 prior to that of nozzles 203 results in a higher entrainment rate enough to significantly increase the performance of the ejector 200. Secondary nozzles 205 introduce a more-favorable entrainment of the secondary flow via shear layers and are staggered both axially and circumferentially in relation to the primary nozzles 203.

Primary nozzles 203 may include a delta-wing structure 226 that is provided with a supporting leg connected to the middle point of the primary nozzle 203 structure at its innermost side, with a delta-wing structure apex pointing against the fluid stream 600 flow. This in turn generates two vortices opposed in direction and strongly entraining from both sides of primary nozzle 203 the already entrained mixture of primary and secondary fluid flows resulting from nozzles 205.

Additionally, an embodiment improves the surface for flow separation delay via elements such as dimples 221 placed on the Coanda surface 204. The dimples 221 prevent separation of the flow and enhance the performance of the ejector 200 significantly. Additionally, surfaces of the diffuser 210 (see FIG. 1) may also include dimples 222 and/or other elements that delay or prevent separation of the boundary layer.

Figure 3:
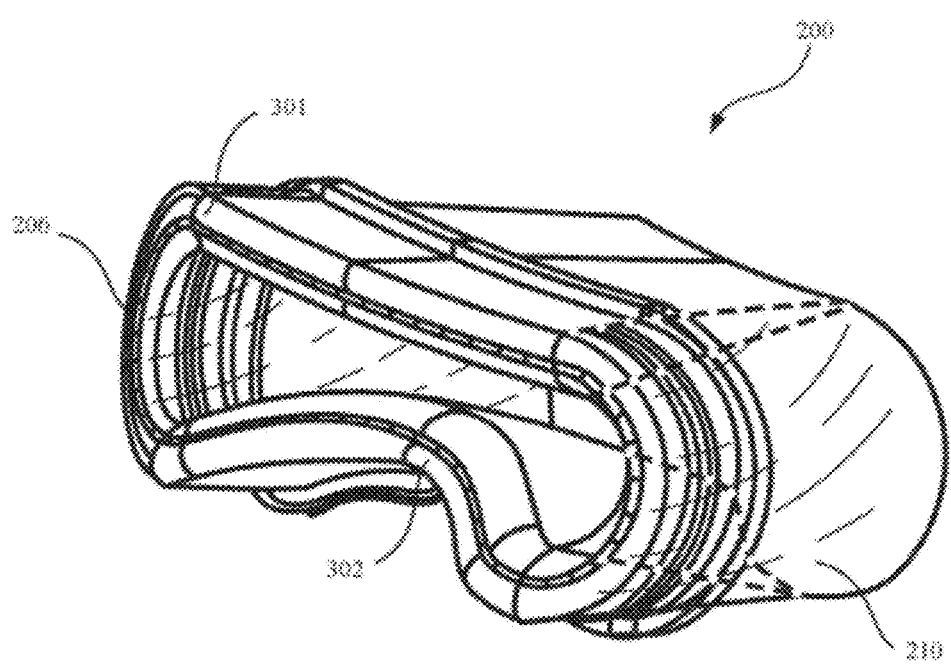
FIGS. 3-4 illustrate partial perspective views of intake structures according to one or more embodiments.
Figure 4:
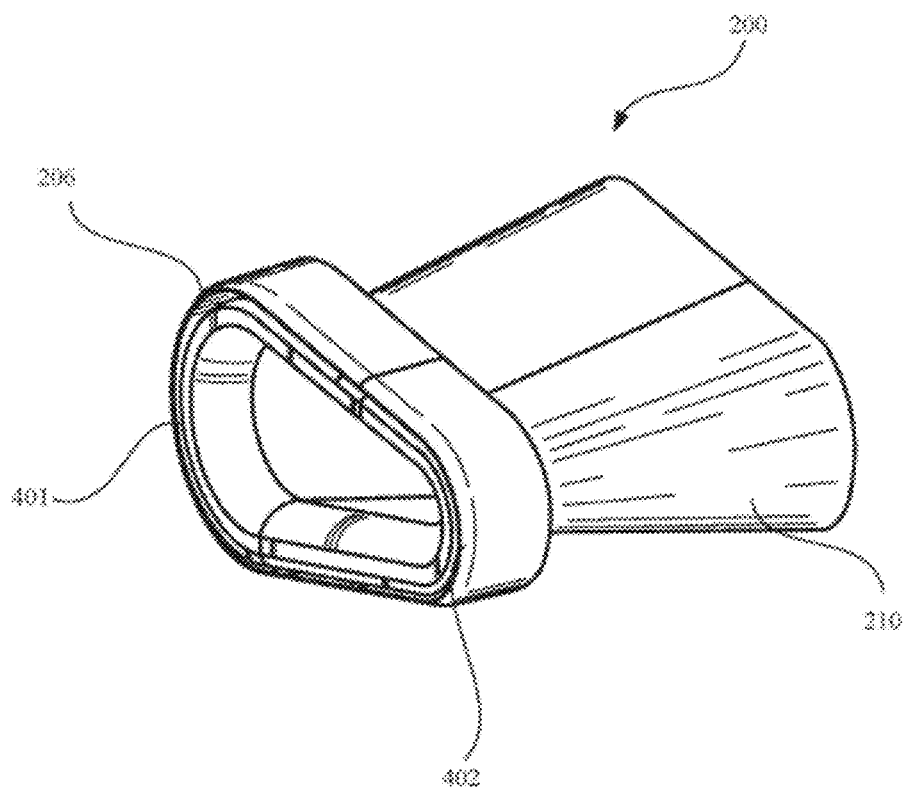

In an embodiment, intake structure 206 may be circular in configuration. However, in varying embodiments, and as best shown in FIGS. 3-4, intake structure 206 can be non-circular and, indeed, asymmetrical (i.e., not identical on both sides of at least one, or alternatively any-given, plane bisecting the intake structure). For example, as shown in FIG. 3, the intake structure 206 can include first and second opposing edges 301, 302, wherein the second opposing edge includes a curved portion projecting toward the first opposing edge. As shown in FIG. 4, the intake structure 206 can include first and second lateral opposing edges 401, 402, wherein the first lateral opposing edge has a greater radius of curvature than the second lateral opposing edge.

Figure 5:
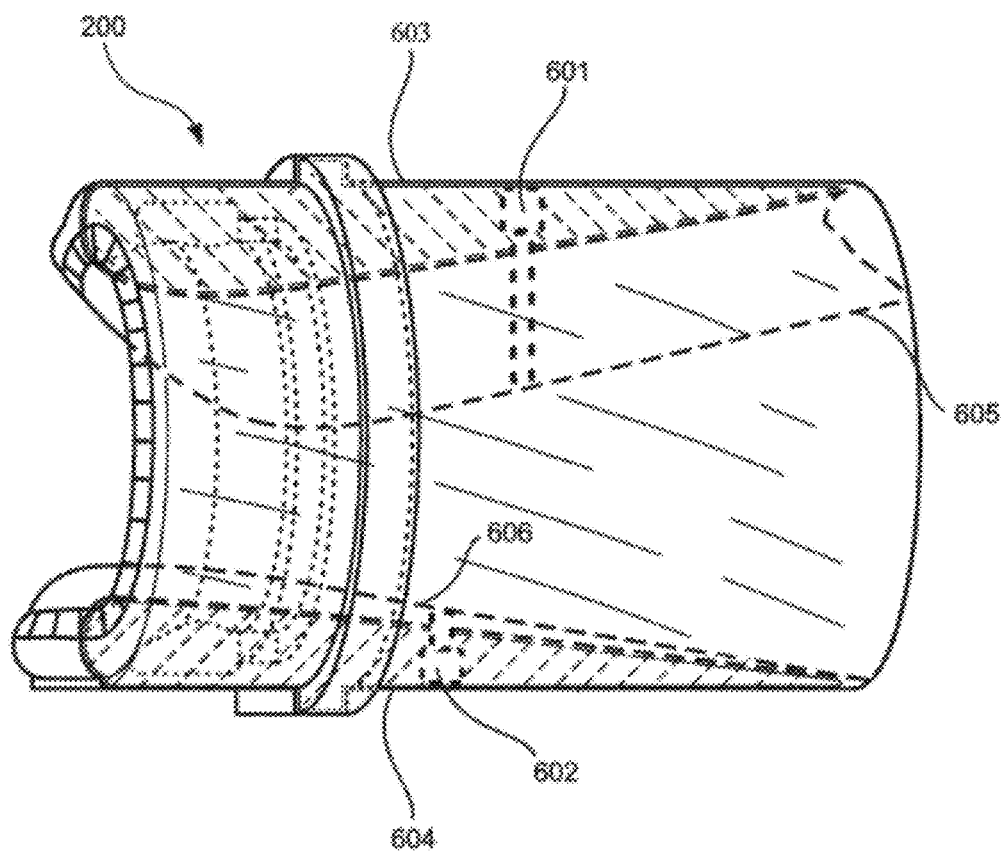
FIG. 5 illustrates in cross-section alteration of ejector internal geometries according to an embodiment.

Referring to FIG. 5, an embodiment may include at least one internal actuating element (e.g., actuators and/or linkages) 601, 602 disposed between external surfaces 603, 604 and internal surfaces 605, 606 of ejector 200. In the illustrated embodiment, actuator 601 is configured to move (e.g., toward and away from the center axis of ejector 200) the first surface 605 relative to the second surface 606 when the second surface is not moving. Similarly, second actuator 602 is configured to move the second surface 606 relative to the first surface 605 when the first surface is not moving. This ability to alter the internal geometry of the ejector 200 into multiple configurations allows ejector to optimally operate in multiple flight conditions (e.g., liftoff, takeoff, cruising flight, etc.).

One or more embodiments primarily use a fluidic propulsive ejector/thruster system (FPS) propulsion. Exemplary FPS systems are described in U.S. patent application Ser. Nos. 15/456,450, 15/221,389 and 15/256,178, for example, which are hereby incorporated by reference as if fully set forth herein. One or more embodiments combine one or more fluidic propulsive ejector/thruster systems (FPS) and distributed propulsion, eliminating "protuberances" sticking out of the vehicle and making the airframe completely streamlined and actively ingesting/controlling boundary layers, where the drag is formed, thereby saving fuel and extending range of travel.

Figure 6:
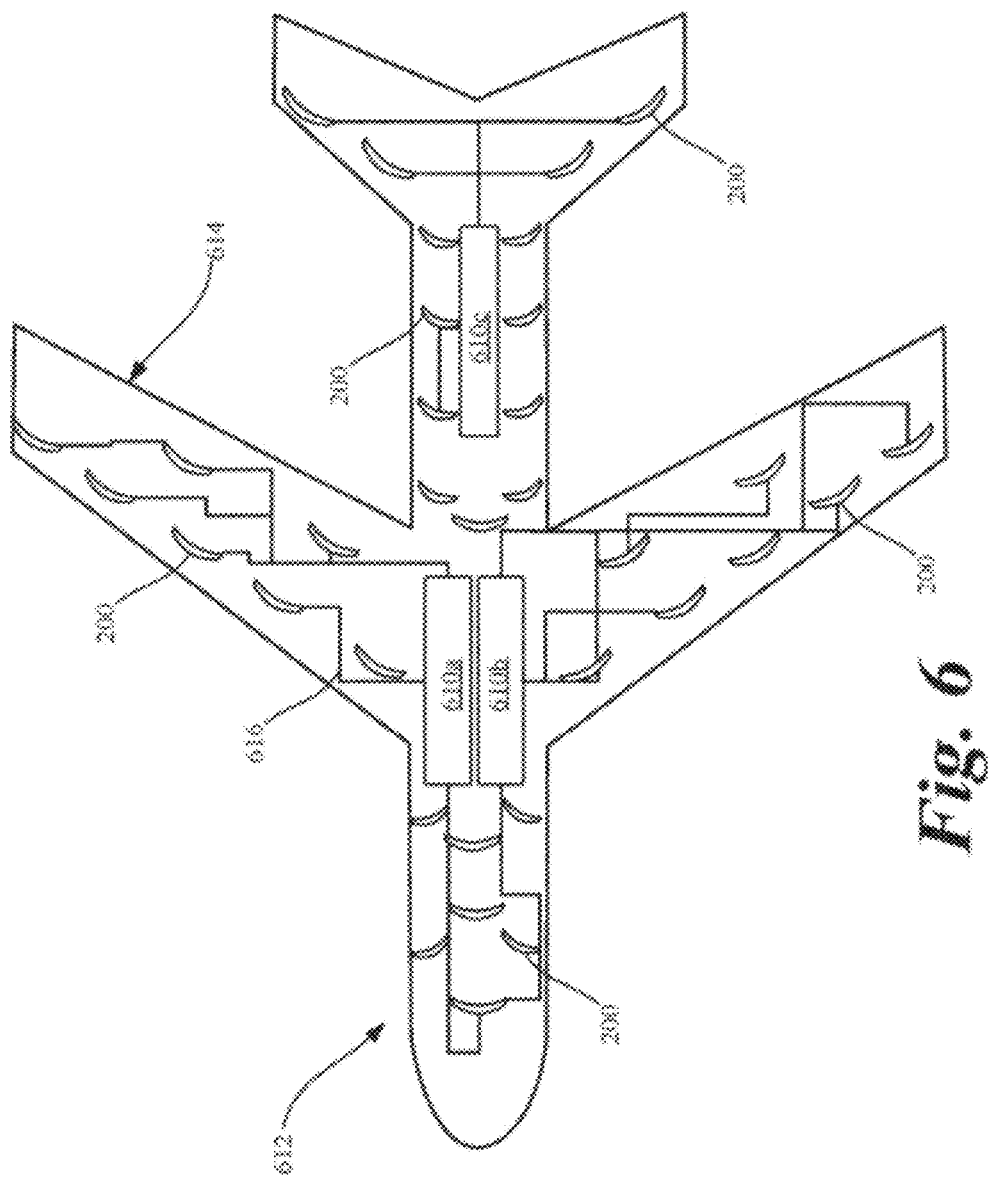
FIG. 6 illustrates a top plan view of an aircraft according to an embodiment.

Referring to FIG. 6, an embodiment uses one or more gas generators 610 a-c to feed, via a series of conduits 616, Coanda-effect-based ejectors 200 attached to the main body, such as fuselage 612, and wings 614 so one can provide both suction and wall jets to lower drag, delay flow separation (which causes drag and early stall) and include distributed propulsion, all across the fuselage and the wings.

One or more embodiments of the ejector 200 can be configured in a shape other than round and can use a primary fluid to entrain (suck in or ingest) massive amounts of air and accelerate this air to higher speeds by mixing the primary and secondary (entrained) fluids (gas from turbine and ambient air, for instance). An embodiment may include a gas turbine feeding (via a pneumatic network—not a mechanical one like most distributed propulsion systems) a plurality of these ejectors 200 that have been mounted almost "flush" with the airplane fuselage 612 and/or wings 614, receive from inside the fuselage or other onboard location the compressed, hot fluid, and use it to entrain more air from the boundary layer formed over the fuselage in front of the ejector, mix with the hot gases inside the ejector and expel it downstream also parallel or tangential to the fuselage in a wall jet fashion.

The distribution of the hot fluid to the ejectors 200 can be done in a controllable fashion using control valves. These ejectors 200, which are many in number and can be made of ceramic composites of thin metal, can be arranged like the feathers on a bird onto the fuselage 612 and wings 614, to complement each other for the suction/entrainment inlet and for the exhaust, in wall jets that are intelligently distributed to cover a large area of the aircraft (i.e., staggered.) Because the ejectors 200 according to various embodiments can be given any shape (rectangular, round, crescent, curvilinear, etc.), any part of the aircraft can be covered (as opposed to placing the suction side at the end of the fuselage of a large airplane, limiting its effect to local conditions and not being effective, plus introducing a large rotating part (rotor/fan) which induces limitations in RPMs for noise and efficiencies). Moreover, at the conditions of high Reynolds numbers and hot temperatures of the gases fed by the distribution network to the ejectors 200, the losses are minimal, and an FPS system will in fact eliminate major rotating parts while saving weight. The network of hot conduits 616 can be insulated with ultralight material, and valves can be used to actuate and allow flow or deny flow to the ejectors 200, where needed and when needed.

Figure 7:
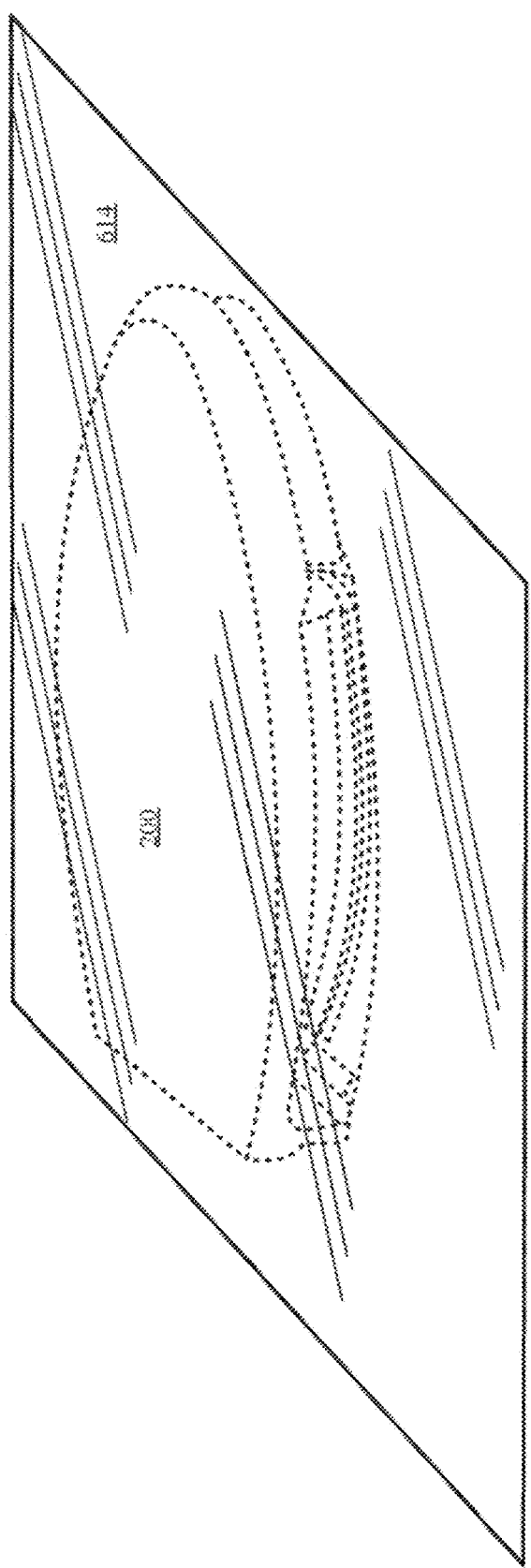
FIGS. 7-8 illustrate a thruster in a retracted position within a wing or fuselage according to an embodiment.
Figure 8:
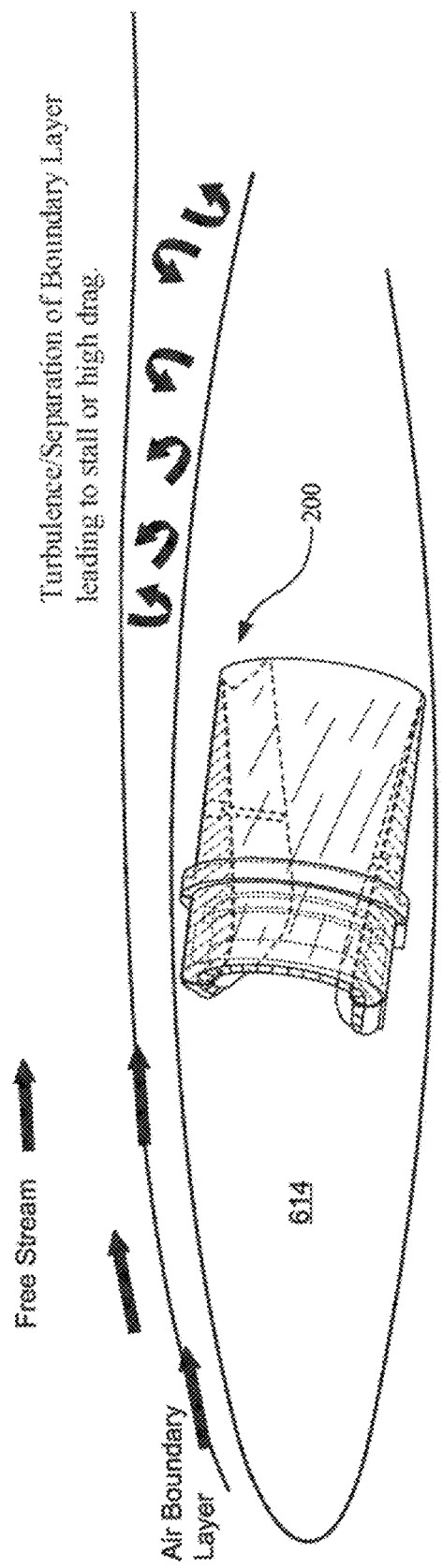
Figure 9:
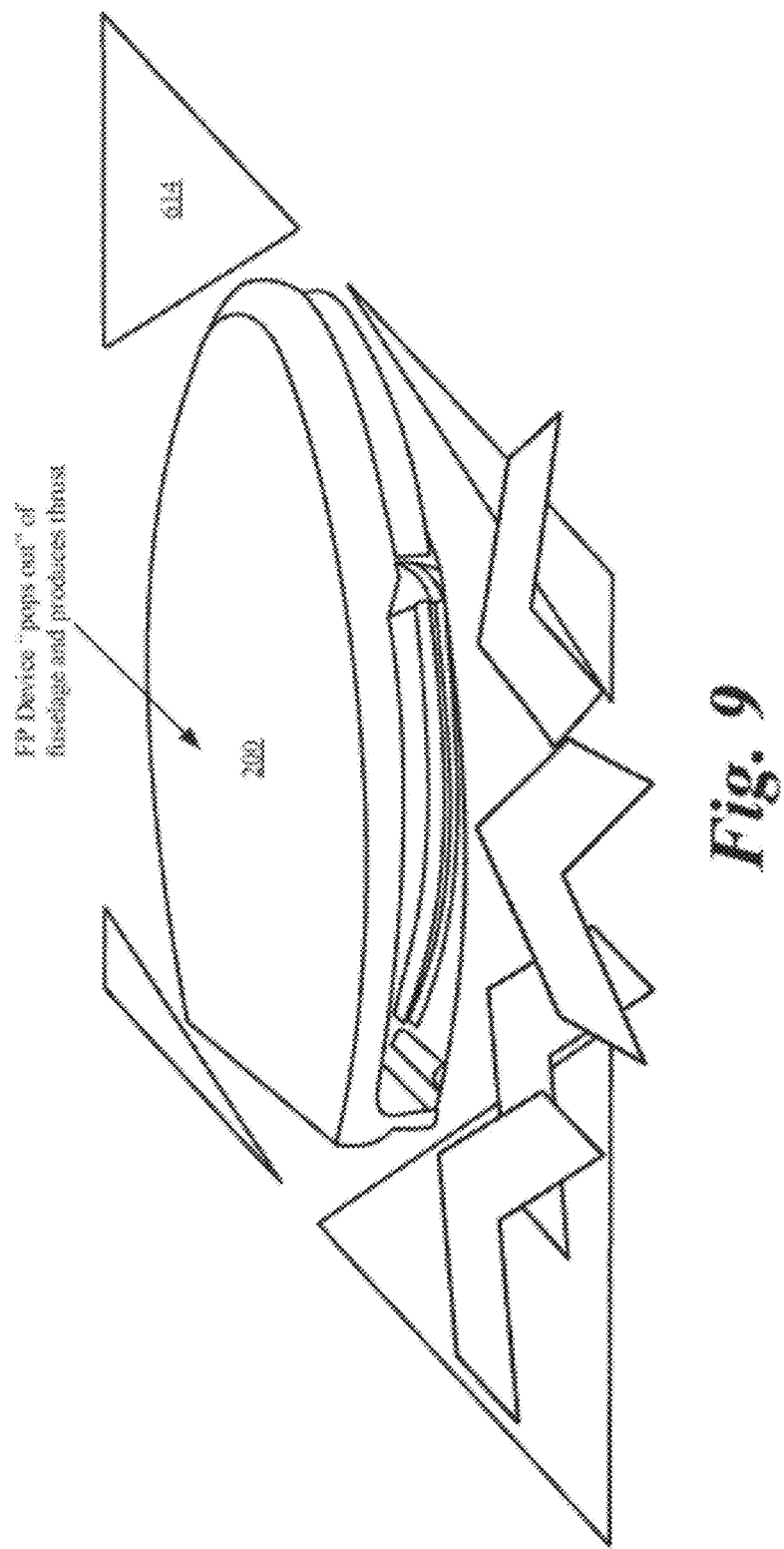
FIGS. 9-10 illustrate a thruster in a deployed position according to an embodiment.
Figure 10:
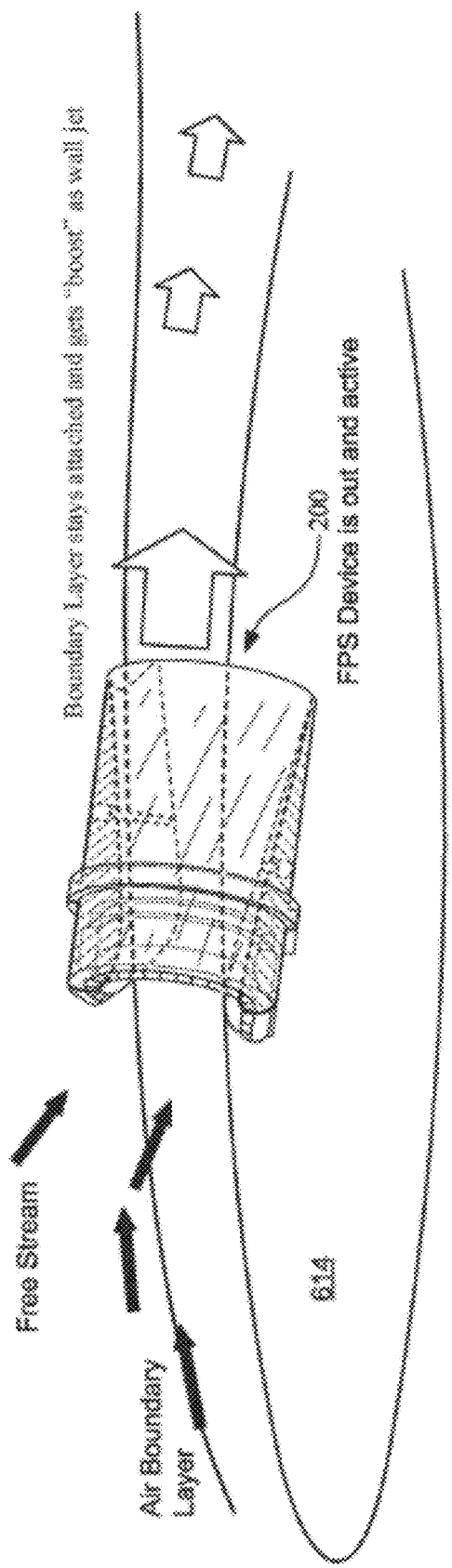

As illustrated in FIGS. 6-10, an embodiment includes one or more gas generators 610 a-c connected fluidically with multiple ejectors 200 that, in a first configuration best illustrated in FIGS. 7-8, are inactive and disposed within the interior of the fuselage 612 or wing 614. As best illustrated in FIGS. 9-10, the ejectors 200 can be caused by appropriate actuating means to emerge from the interior of the fuselage 612 or wing 614 as needed, forcing the flow of the gas produced by the gas generator 610 a-c to entrain massive amounts of air and generate suction regions over the majority of the body of the aircraft. The particular advantage of this configuration is that the boundary layer is "re-energized" and turned into a jet which is capable of producing thrust. Additionally, the thrust is truly now "distributed" across the aircraft, guaranteeing a very large propulsive efficiency. This combined with a high thermal efficiency from a gas generator that has at least a pressure ratio of 20:1 will make the aircraft very efficient, including also the lower drag guaranteed by the distribution of the ejectors 200.

While the preferred embodiment of the disclosure has been illustrated and described, as noted above, many changes can be made without departing from the spirit and scope of the disclosure. Accordingly, the scope of the described systems and techniques is not limited by the disclosure of the preferred embodiment. Instead, the described systems and techniques should be determined entirely by reference to the claims that follow.

The embodiments of the present disclosure in which an exclusive property or privilege is claimed are defined as follows:

1. A method, comprising:
   ingesting, with a first intake structure of an active first thruster in response to a compressed fluid, at least a portion of a boundary layer produced due to motion of whichever of a vehicle body or a vehicle wing the first thruster is coupled;
   moving a first internal surface and a first external surface of the active first thruster relative to each other; and
   activating the first thruster by moving the first thruster to a position outside of whichever of the vehicle body or the vehicle wing the first thruster is coupled.

2. The method of claim 1, further comprising:
   mixing the compressed fluid with a secondary fluid in a first diffusing structure of the first thruster; and
   smoothening a spatial temperature profile of a mixture of the compressed fluid and the secondary fluid as the mixture travels from a first throat section to a first terminal end of the first diffusing structure.

3. The method of claim 1, further comprising:
   mixing the compressed fluid with a secondary fluid in a first diffusing structure of the first thruster; and smoothening a spatial velocity profile of a mixture of the compressed fluid and the secondary fluid as the mixture travels from a first throat section to a first terminal end of the first diffusing structure.

4. The method of claim 1, further comprising ingesting, with a second intake structure of an active second thruster in response to the compressed fluid, at least a portion of a boundary layer produced due to motion of the other of the vehicle body or the vehicle wing to which the second thruster is coupled.

5. The method of claim 4, further comprising moving a second internal surface and a second external surface of the active second thruster relative to each other.

\* \* \* \* \*